United States Patent [19]

Pormale et al.

[11] 3,904,600

[45] Sept. 9, 1975

[54] HIGH-MOLECULAR DERIVATIVE OF 2-DIETHYLAMINOETHYL-PARA-AMINOBENZOATE HYDROCHLORIDE AND METHOD FOR PREPARING IT

[76] Inventors: Milda Yanovna Pormale, ulitsa Suvorova, 104, kv. 10; Nadezhda Alexandrovna Kashkina, ulitsa Talsu, 9/11, kv. 22; Ieva Petrovna Leiman, ulitsa Stokkholmas, 17, kv. 1; Arvid Yanovich Kalninsh, ulitsa Sverdlova, 8, kv. 3; Yan Shuster, ulitsa Kveles, 15, korpus 4, kv. 30, all of Riga; Valdis Danielovich Mikazhan, Stopinsky selsovet, Tuberkuleznaya bolnitsa, korpus 1, Rizhsky raion, all of U.S.S.R.

[22] Filed: Mar. 20, 1974

[21] Appl. No.: 453,669

[52] U.S. Cl............................ 260/231 A; 424/180
[51] Int. Cl............................................. C08b 11/00
[58] Field of Search..................... 260/231 A, 232

[56] References Cited
UNITED STATES PATENTS

| | | | |
|---|---|---|---|
| 3,563,692 | 2/1971 | Ward et al. | 260/231 A |
| 3,664,999 | 5/1972 | Khusid et al. | 260/231 A |

*Primary Examiner*—Ronald W. Griffin
*Attorney, Agent, or Firm*—Waters, Schwartz & Nissen

[57] ABSTRACT

The high-molecular weight derivative of 2-diethylaminoethyl-p-aminobenzoate hydrochloride, having the general formula

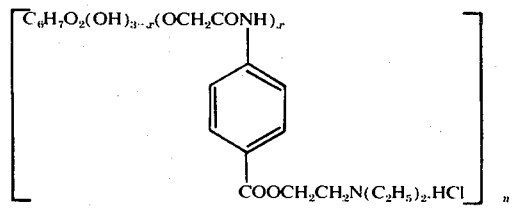

where $x$ is the degree of substitution from 0.6 to 1.00, and $n$ is the degree of polymerization from 40 to 120, consists in reacting carboxymethylcellulose methylate with 2-diethylaminoethyl-p-aminobenzoate hydrochloride in an aqueous medium, with subsequent isolation of the end product from the obtained solution.

3 Claims, No Drawings

HIGH-MOLECULAR DERIVATIVE OF 2-DIETHYLAMINOETHYL-PARA-AMINOBENZOATE HYDROCHLORIDE AND METHOD FOR PREPARING IT

This invention relates to a new substance, a high molecular weight derivative of 2-diethylaminoethyl p-aminobenzoate hydrochloride and a method for preparing it.

The new substance has the following general formula

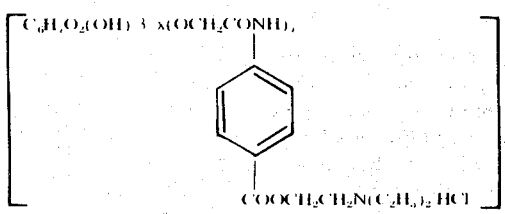

where x is the degree of substitution from 0.60 to 1.00, and
n is the degree of polymerization from 40 to 120.

The compound of the invention is an amorphous substance, slightly yellow in color, hygroscopic, readily soluble in water, insoluble in organic solvents.

The said high-molecular weight derivative of 2-diethylamino-ethyl-p-aminobenzoate hydrochloride has biological activity and can therefore be used in medicine as a local anesthetic.

According to the invention, the method for preparing the high-molecular weight derivative of 2-diethylaminoethyl-p-amino-benzoate hydrochloride consists in reacting carboxymethylcellulose methylate with 2-diethylaminoethyl-p-aminobenzoate hydrochloride in an aqueous medium in a current of a noble gas, and isolating the end product from the obtained solution.

It is recommended that the reaction between the components be carried out at a temperature of 80°–100°C in a current of a noble gas.

It is recommended also that the starting components for preparing the end product be taken in equimolecular quantities.

The process can be carried out also in excess 2-diethylaminoethyl-p-aminobenzoate hydrochloride, calculated with reference to the methoxy groups of carboxymethylcellulose methylate and the primary amino group of the molecule of 2-diethylaminoethyl-p-aminobenzoate hydrochloride.

The end product should preferably be isolated by precipitation with acetone or ethyl ether.

The method for preparing the high-molecular weight derivative of 2-diethylaminoethyl-p-aminobenzoate hydrochloride is effected as follows.

Carboxymethylcellulose methylate reacts with 2-diethylaminoethyl-p-aminobenzoate hydrochloride in an aqueous medium in which the starting components are dissolved.

The process can be carried out both at room temperature and at a temperature of 80°–100°C with stirring. In order to accelerate the process it is recommended to carry out the reaction with heating. The completeness of the reaction is controlled by titrating the primary amino group. When the process is complete, the obtained solution is passed through a filter, and the end product is separated preferably by precipitating it with an organic solvent (acetone, ethyl alcohol) miscible with water.

The end product is prepared by reacting equimolecular quantities of carboxymethylcellulose methylate and 2-diethylaminoethyl-p-aminobenzoate hydrochloride, or the process is carried out in excess 2-diethylaminoethyl-p-aminobenzoate hydrochloride, calculated with reference to the methoxy groups of carboxymethylcellulose methylate and the primary amino group of the molecule of 2-diethylaminoethyl-p-aminobenzoate hydrochloride.

Carboxymethylcellulose methylate having a substitution degree from 0.60 to 1.00 is used in the reaction.

As carboxymethylcellulose methylate reacts with 2-diethylaminoethyl-p-aminobenzoate hydrochloride, the hydrogen atom is split off from the primary amino group and methoxy group of carboxymethylcellulose methylate.

2-diethylaminoethyl-p-aminobenzoate hydrochloride is joined to carboxymethylcellulose methylate by a covalent bond. The yield of the end product is 74–92 per cent by weight.

For a better understanding of the invention, the following examples of its practical embodiment are given by way of illustration.

EXAMPLE 1

The starting material, carboxymethylcellulose methylate can be prepared as follows. 20 g of sodium carboxymethylcellulose, having a characteristic viscosity ($\eta$) = 0.99 (mol. wt. 26,000) and a degree of substitution 0.88, are dissolved in 300 ml of distilled water and 50 g of ion-exchange resin (in the H form) having the volumetric capacity 4.7 mg-equ/g are added. The components are shaken for two hours and the ion-exchange resin is separated from the solution of carboxymethylcellulose.

A three-neck flask provided with a gas-discharge tube, a thermometer, and a stirrer is charged with 300 ml of an aqueous solution of carbomethylcellulose having a concentration of 0.275 mol/liter and then 300 ml of an ether solution of diazomethane having a concentration of 0.242 mol/liter are added. The reaction is continued until all diazomethane is decomposed the end-point being located by discoloration of the solution and by discontinuation of nitrogen bubbling. The ether layer is then separated and the obtained carboxymethylcellulose methylate is purified by two-fold precipitation and washing with acetone.

The obtained carboxymethylcellulose methylate has the following characteristics:

| | |
|---|---|
| COOCH$_3$ group content | 34.60 percent |
| specific viscosity | 1.05 percent |

The COOCH$_3$ group content of the polymer is determined by saponification.

The obtained carboxymethylcellulose methylate is used as the basis of the high-molecular weight component, to which 2-diethylaminoethyl-p-aminobenzoate hydrochloride is joined by the covalent bond.

To 150 ml of a 1 per cent aqueous solution of carboxymethylcellulose methylate are added 15 g of 2-diethylaminoethyl-para-aminobenzoate hydrochloride. The components are mixed and kept at room temperature for 94 hours. The obtained product is isolated from the reaction mixture by acetone. The product is then purified from unreacted amine by dissolving it twice in water with subsequent precipitation by acetone by extraction and drying to constant weight. The yield is 2.8 g of the end product which is 91 per cent by weight of theory. The structure of the polymer is proved by elementary analysis. Nitrogen, carbon and hydrogen are determined by titration with HCl and by the I-R absorption spectra.

Found, in per cent: N 5.49; C 52.77; H 5.84; HCl 7.32.

Calculated, in per cent: N 5.63; C 52.65; H 6.05; HCl 7.58

EXAMPLE 2

A three-neck flask is charged with 10 g of water-soluble carboxymethylcellulose methylate having the substitution degree 0.8, and 100 ml of distilled water. To the solution are added 10 g of 2-diethylaminoethyl-p-aminobenzoate hydrochloride and the reaction is carried out at a temperature of 97°C in a current of argon for 5 hours. The precipitation and washing processes are the same ad described in Example 1. The yield is 18.1 g (89 per cent by weight of theory) of dry product containing 51.75 per cent by weight of 2-diethylaminoethyl-p-aminobenzoate hydrochloride.

Found, in per cent:N 5.13; HCl 6.80; C 52.51; H 6.17.

Calculated, in per cent: N 5.30; HCl 6.87; C 52.70; H 6.35.

We claim:

1. A high-molecular weight derivative of 2-diethylaminoethyl-p-aminobenzoate hydrochloride having the general formula

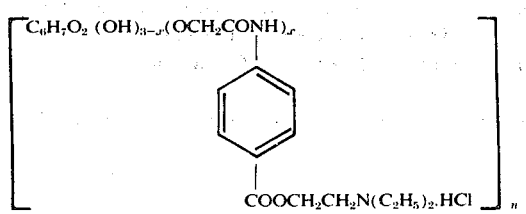

where $x$ is the degree of substitution from 0.6 to 1.00, and $n$ is the degree of polymerization from 40 to 120.

2. A method for preparing the high-molecular weight derivative of 2-diethylaminoethyl-p-aminobenzoate hydrochloride having the general formula set forth in claim 1 consisting of reacting equimolecular quantities of carboxymethylcellulose methylate and 2-diethylaminoethyl-p-aminobenzoate hydrchloride in an aqueous medium at a temperature from 80° to 100°C in a current of a noble gas, with subsequent isolation of the end product from the obtained solution.

3. A method according to claim 2, in which the end product is isolated by precipitation with a solvent selected from the group consisting of acetone and ethyl ether.

* * * * *